United States Patent
Cho (10) Patent No.: US 6,719,866 B2
(45) Date of Patent: Apr. 13, 2004

(54) LIQUID PRESSURE TRANSFER PRINTING METHOD OF STEERING WHEEL RIM FOR AUTOMOBILE

(76) Inventor: Youn-Soo Cho, 504-201 Hyojachon, 301 Seohyun-dong, Bundang-gu, 463-050 Sungnam-city, Kyungki-do (KR)

( * ) Notice: Subject to any disclaimer, the term of this patent is extended or adjusted under 35 U.S.C. 154(b) by 0 days.

(21) Appl. No.: 10/169,832

(22) PCT Filed: Jan. 10, 2001

(86) PCT No.: PCT/KR01/00035

§ 371 (c)(1),
(2), (4) Date: Oct. 3, 2002

(87) PCT Pub. No.: WO01/66405

PCT Pub. Date: Sep. 13, 2001

(65) Prior Publication Data

US 2003/0056889 A1 Mar. 27, 2003

(30) Foreign Application Priority Data

Jan. 10, 2000 (KR) .............................................. 2000-938

(51) Int. Cl.⁷ ..................... B44C 1/175; B32B 31/18; B41M 3/12; B05D 5/06; B05D 1/20
(52) U.S. Cl. ..................... 156/230; 156/236; 156/240; 156/250; 156/285; 427/149; 427/262; 427/272; 427/434.3; 269/55
(58) Field of Search ................................. 156/230, 236, 156/240, 241, 247, 277, 289, 285, 250, 257, 267; 427/146, 147, 141, 454.4, 434.5, 256, 258, 262, 264, 271, 272, 430.1; 118/402, 403; 267/55, 56, 77

(56) References Cited

U.S. PATENT DOCUMENTS

| | | | |
|---|---|---|---|
| 3,590,458 A | * 7/1971 | Day | ........................ 29/200 |
| 6,010,751 A | 1/2000 | Shaw et al. | |
| 6,022,438 A | 2/2000 | Watanabe et al. | |
| 6,065,366 A | 5/2000 | Koyama et al. | |

FOREIGN PATENT DOCUMENTS

| | | | |
|---|---|---|---|
| EP | 957021 A2 | * 11/1999 | ............ B62D/1/04 |
| JP | 60-143961 | 7/1985 | |
| JP | 61-130081 | 6/1986 | |

* cited by examiner

Primary Examiner—J. A. Lorengo
(74) Attorney, Agent, or Firm—Leydig, Voit & Mayer, Ltd.

(57) ABSTRACT

A steering wheel rim for an automobile is manufactured by attaching a masking tape to a boundary portion of the steering wheel rim, marking a conjunction line using a blade in a middle portion the masking tape and detaching a lower half portion of the masking tape, covering an upper portion of the masking tape with a protective masking tape, performing transfer printing on a surface lower than the conjunction line, cleaning and drying the transfer-printed surface, and removing the masking tape and the protective masking tape. Another masking tape is attached to a first transfer printing boundary portion of the steering wheel rim, a separation line is marked using a blade at a position about 0.05–0.2 mm lower than the conjunction line and removing the upper half of the masking tape is removed, the lower portion of the masking tape is covered with another protective masking tape, and transfer printing is performed on an upper surface above the conjunction line. After cleaning and drying the transfer-printed surface, the masking tape and the protective masking tape are removed.

3 Claims, 6 Drawing Sheets

LIQUID PRESSURE TRANSFER PRINTING METHOD OF STEERING WHEEL RIM FOR AUTOMOBILE

TECHNICAL FIELD

The present invention relates to a method for manufacturing a steering wheel rim for an automobile by using a liquid pressure transfer printing method and an apparatus for cutting a masking tape used therefor, and more particularly, to a method for manufacturing a steering wheel rim for an automobile by using a liquid pressure transfer printing method, in which a masking tape is used in a matching process of a combination portion by a polyvinyl alcohol (PVA) solution when separate transfer printing is formed due to a limit in shape of an object subject to transfer printing so that environmental pollution is minimized due to reduction in the amount of waste water and productivity and reliability of products are improved, and an apparatus for cutting a masking tape used therefor.

BACKGROUND ART

Techniques of printing various patterns on a surface of a steering wheel rim for an automobile by using a liquid pressure transfer printing method have been suggested in Korean Patent Application Nos. 17425, 36990 and 36991 filed by the present applicant in 1998.

Also, to improve and automate the above suggested techniques, the present applicant filed Korean Patent Application No. 3368 in 1999 and Korean Patent Application No. 11606 in 1999 as a technique for matching combination of patterns.

Figure 1:
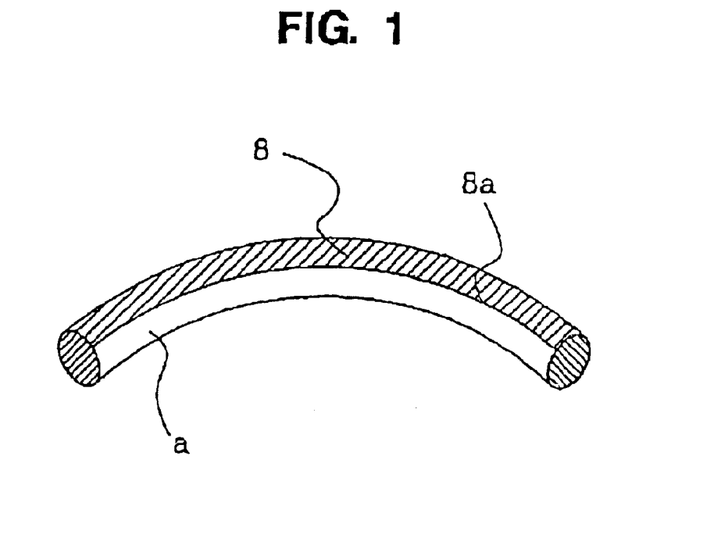
FIG. 1 is perspective view showing portion of a steering wheel rim for explaining the conventional liquid pressure transfer printing method.

In Korean Patent Application Nos. 36990 and 36991 filed in 1998, as shown in FIG. 1, since a first mask member 8 and a conjunction line 8a in the middle must be accurately matched, and after a first transfer printing is performed on a surface a that is a portion which is not masked, a second masking must be accurately performed with an interval of about 0.1 mm from the conjunction line in the middle, an accurate transfer printing work at a boundary surface is very difficult and manufacturing productivity is deteriorated due to a slow work speed. Furthermore, such difficulties have been a factor in the increase of the cost.

Also, since the entire surface subject to transfer printing is masked in the first and second steps, the masking tape is wasted. Further, according to a degree of skill of a worker, the conjunction line 8a in the middle is not matched so that defective products are often generated.

Also, the technique disclosed in Korean Patent Application No. 17425 filed by the present applicant in 1998 is a method in which masking tape and PVA solution are used. In FIG. 1, when the first mask member 8 is attached, tiny pores are generated in a transfer film at a combination portion, forming a non transfer-printing strip due to the thickness of the masking tape during the second transfer printing step. To overcome the above problem, an edge portion located at the conjunction line 8a in the middle of the masking tape 18, that is, the edge of the first mask member 8, is needed to be cut at an inclination angle of about 60°. However, such cutting is difficult. Also, when the first mask member 8 is removed after PVA coating and drying, after transfer printing is performed on the surface a and the surface is cleaned and dried, the PVA film is not uniformly removed and is unevenly lifted from the boundary surface so that defects, such as mismatch or overlap of transfer printing, are generated.

Also, in Korean Patent Application No. 3368 filed by the present applicant in 1999, the masking tape and PVA solution are used together and a conjunction line in the middle of the masking tape is semiautomatically and uniformly processed by using a predetermined jig.

In the case of mass production by using the above method, a considerable time is needed for drying due to use of a large amount of PVA solution. Accordingly, drying equipment is additionally needed and s-space for drying is needed. Also, cleaning equipment for cleaning the PVA solution is additionally needed. Further, waste water purification equipment is needed due to an increase in the amount of cleaning. When conditions for drying are not proper after the PVA solution coating, the conjunction line is incorrect and thus products may be defective. As a result, due to the above restrictions and problems, the costs of products increase.

DISCLOSURE OF THE INVENTION

To solve the above problems, it is an objective of the present invention to provide a method for manufacturing a steering wheel rim for an automobile by using a liquid pressure transfer printing method; by which mass production is possible, by remarkably improving productivity, the cost for manufacturing a product is considerably reduced by adding minimum equipment so that the existing equipment is effectively used in a limited space, the amount of waste water is sharply reduced so that environmental pollution is reduced, and an unskilled worker can perform an accurate pattern match on the boundary surface during separate transfer printing regardless of conditions for drying.

To accomplish the above object of the present invention, there is provided a method for manufacturing a steering wheel rim for an automobile by using a liquid pressure transfer printing method, which comprises attaching a first masking tape having a predetermined width to a boundary portion of the steering wheel rim to be separately transfer-printed, marking a conjunction line using a blade in a middle portion of the first masking tape attached to the steering wheel rim, with the steering wheel rim placed on a horizontal rotary pedestal, and detaching a lower half portion of the first masking tape, covering an upper portion of the first masking tape which is not detached with a first protective masking tape, performing transfer printing on a surface of the steering wheel rim lower than the conjunction line and cleaning and drying the transfer-printed surface, and removing the first masking tape which has not been detached and the first protective masking tape covering the upper portion of the first masking tape, attaching a second masking tape having a predetermined width to a first transfer printing boundary portion of the steering wheel rim to which transfer printing has been performed, marking a separation line using a blade at a position about 0.05–0.2 mm lower than the conjunction line of the second masking tape attached to the steering wheel rim which is placed on the horizontal rotary pedestal, and removing an upper half of the second masking tape, covering a lower portion of the second masking tape which has not been removed with a second protective masking tape, and transfer printing on an upper surface of the steering wheel rim above the conjunction line and cleaning and drying the transfer-printed surface, removing the second masking tape and the second protective masking tape.

Also, to accomplish the above object of the present invention, there is provided an apparatus for cutting a masking tape used for manufacturing a steering wheel rim for an automobile by using a liquid pressure transfer printing method, which comprises a horizontal rotary pedestal which is rotatable and has a horizontally flat surface on which the steering wheel rim is closely placed, and a clamp provided at the side portion of the horizontal rotary pedestal to fix the steering wheel rim.

It is preferred in the present invention that a plurality of blade holders are formed on the horizontal rotary pedestal, each having a blade moving along the surface of the horizontal rotary pedestal so that a cut line is marked at a predetermined height from the surface of the horizontal rotary pedestal.

BEST MODE FOR CARRYING OUT THE INVENTION

Detailed steps in the present method and a cutting apparatus used therein are described with reference to the attached drawings.

One of the greatest features of the present invention is that only a masking tape is used without using PVA solution. That is, as shown in FIG. 2, for example of a steering wheel rim for an automobile, when a portion partially formed of hard urethane is subject to liquid transfer printing, a masking tape 18 which is a strip having a width of 4–5 mm is attached and the steering wheel rim is placed on an upper plate 21 of a horizontal rotary pedestal and fixed by a clamp 23, as shown in FIG. 3.

A blade holder 24 is disposed on the upper plate 21. A blade 25 of which the height can be adjusted is installed at the blade holder 24. The height of the blade 25 may be adjusted by adopting a simple structure in which a groove for accommodating the blade 25 is formed in a lengthwise direction of the blade holder 24 and the blade 25 is fixed or loosed by using a screw penetrating in a radial direction of the blade holder 24. In addition, various structures regardless of a particular shape may be applied.

Figure 6:
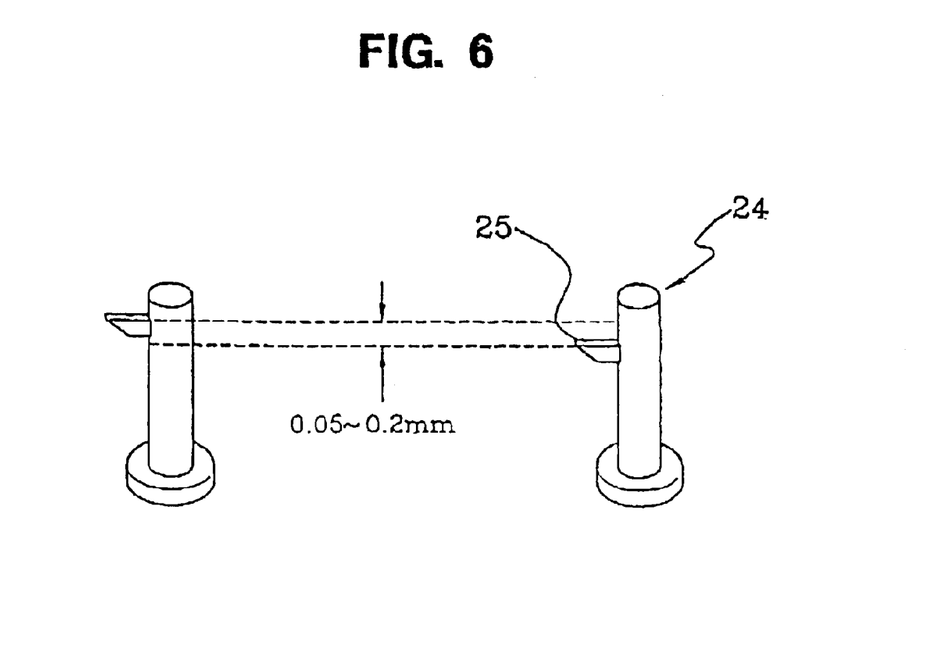
FIG. 6 is a perspective view of a blade holder set according to the present invention.

The blade 25 of the blade holder 24, like the left blade shown in FIG. 6, is fixed to a height of the conjunction line 8a in the middle portion of the masking tape 18 which is indicated by a dotted line.

Figure 2:
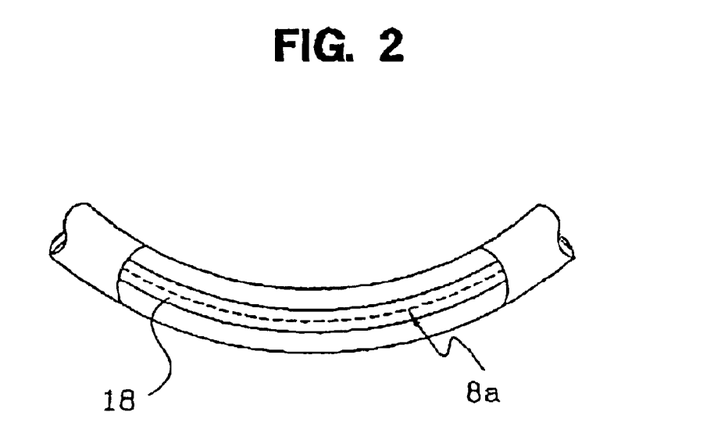
FIG. 2 is a perspective view showing portion of a steering wheel rim in which the masking tape is attached and the conjunction line is formed.
Figure 3:
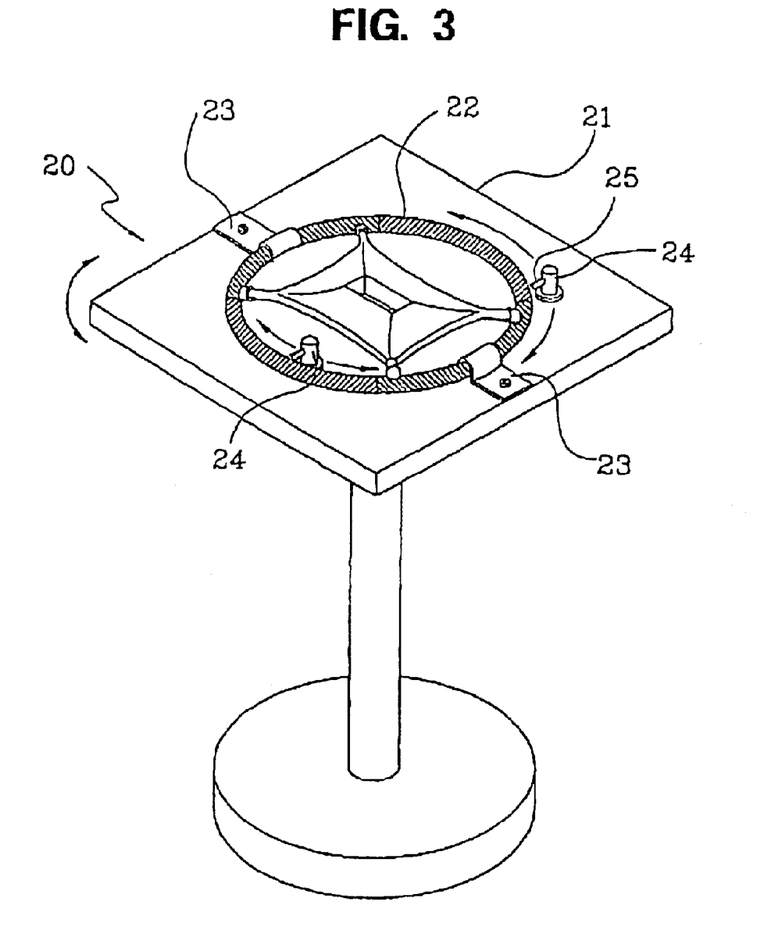
FIG. 3 is a perspective view showing the structure of a masking tape cutting apparatus according to a present invention.
Figure 4:
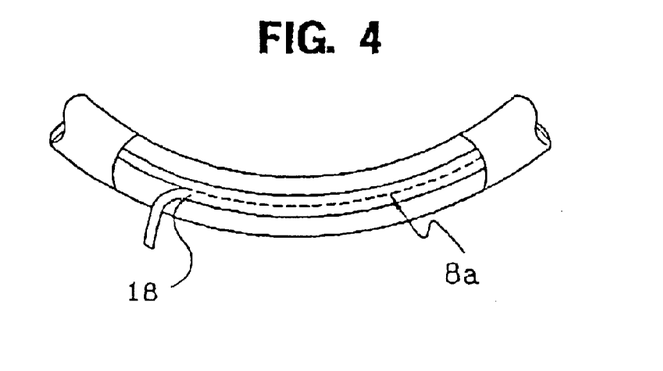
FIG. 4 is a perspective view of portion of a steering wheel rim in a step of removing part of the masking tape.

As shown in FIG. 3, in the state in which the steering wheel rim 22 is fixed, the blade holder 24 is rotated around the outer circumference of the steering wheel rim 22 or the upper plate 21 is rotated while the blade holder 24 is manually held, to mark the conjunction line 8a as indicated by a dotted line of FIG. 2. Then, as shown in FIG. 4, the masking tape 18 at the lower portion with respect to the conjunction line 8a is separated. The step of detaching the masking tape 18 may be performed to the masking tape 18 at the inner circumference of the steering wheel rim 22.

Figure 5:
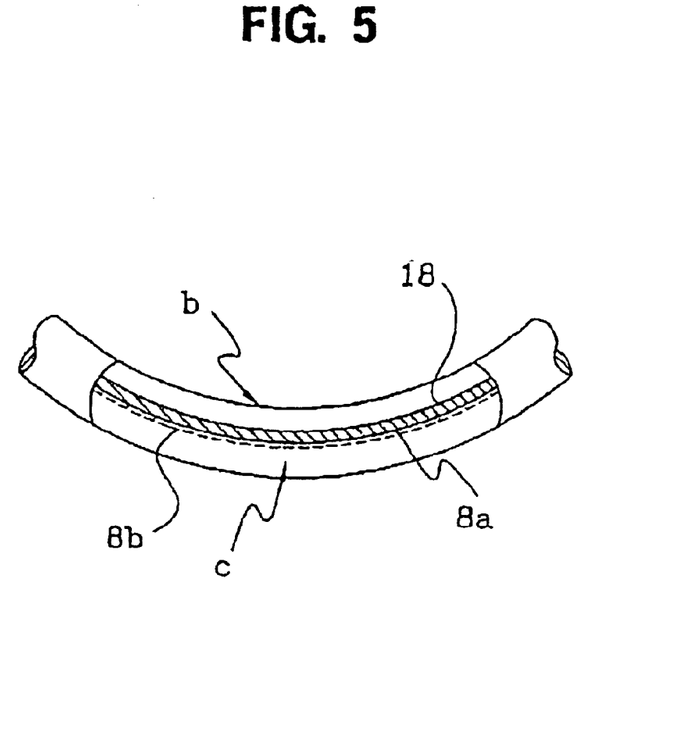
FIG. 5 is a perspective view of portion of a steering wheel rim in a step of forming a separation line.

After a separately prepared protective masking tape is attached on a surface b as shown in FIG. 5, transfer printing is performed on a surface c which is below the surface b. After the transfer-printed surface c is cleaned and dried, the masking tape 18 and the protective masking tape attached on the surface b are removed. Then, the masking tape 18 is attached again in the middle of the steering wheel rim 22 in a lengthwise direction thereof, as shown in FIG. 4. The steering wheel rim 22 is flipped and placed on the upper plate 21 of the horizontal rotary pedestal 20 and is fixed by the clamp 23.

Here, the height of the blade 25 of the blade holder 24 is fixed at a height 0.05–0.2 mm lower than the middle conjunction line 8a, like the right blade shown in FIG. 6. Thus, a conjunction line 8b is formed as indicated by a dotted line in FIG. 5.

The height adjustable blade 25 coupled to the blade holder 24 may be adopted, or as shown in FIG. 6, two blade holders 24 fixed to maintain a height difference between the blades 25 within a range of 0.05–0.2 mm may be used. The portion of the masking tape 18 above the separation line 8b is removed and then a protective masking tape is attached to a portion of the steering wheel rim 22 below the separation line 8b. The surface b which is not transfer-printed is secondly transfer-printed and cleaned and dried so that a clean transfer printing can be performed forming a match around the boundary line.

Figure 7A:
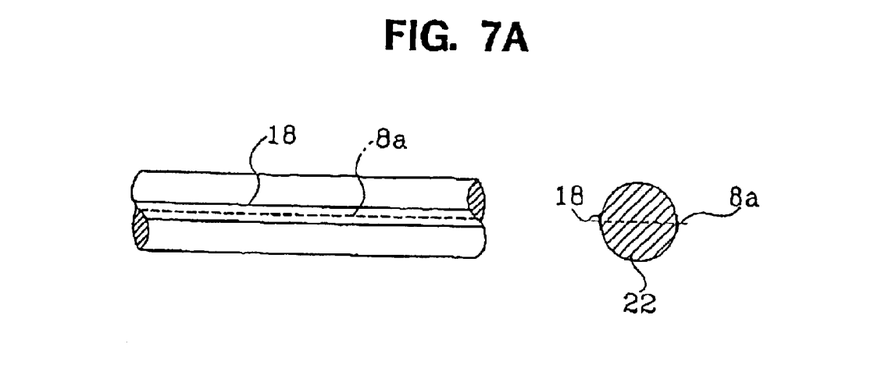
FIGS. 7A through 7I are views for sequentially showing the liquid pressure transfer printing method according to the present invention.
Figure 7B:
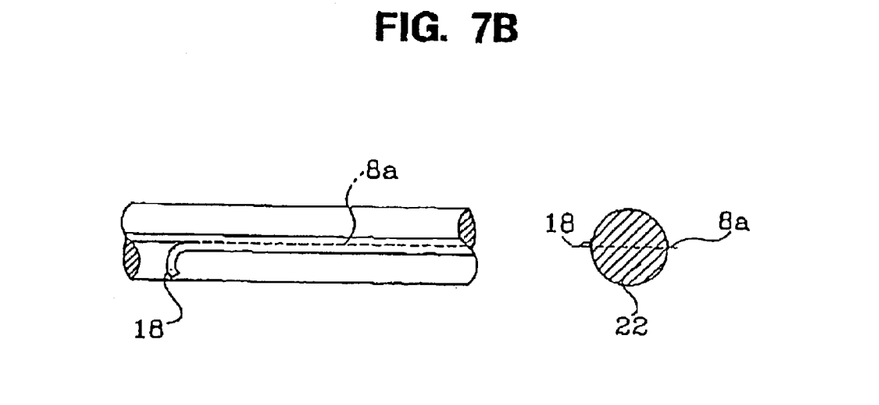

The above-described separate transfer printing steps are described in order with reference to the drawings. First, as shown in FIG. 7A, the masking tape 18 having a predetermined width is attached in the middle portion of the steering wheel rim 22 in a lengthwise direction. The conjunction line 8a is marked at around the middle portion of the masking tape 18 by using the blade 25. Next, as shown in FIG. 7B, the masking tape 8a at the lower portion below the conjunction line 8a is removed, here, the reason of forming a conjunction line 8a after attaching the masking tape 18 having a predetermined width is to accurately maintain a portion where the masking tape 18 is attached. By performing this step, an unskilled worker can easily perform a masking work at a non transfer printing portion.

Figure 7C:
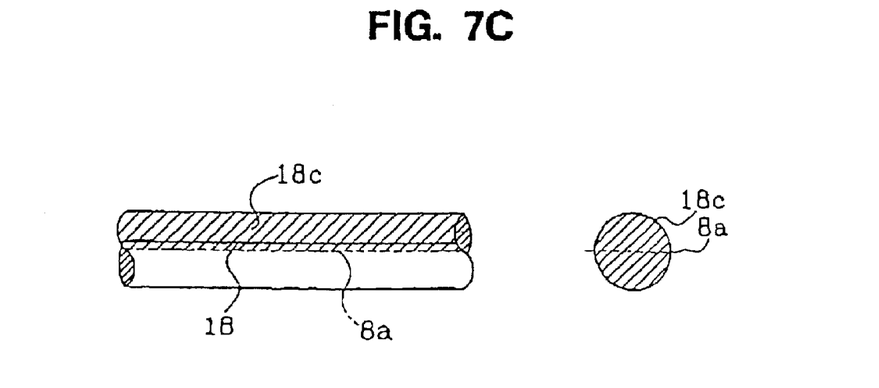
Figure 7D:
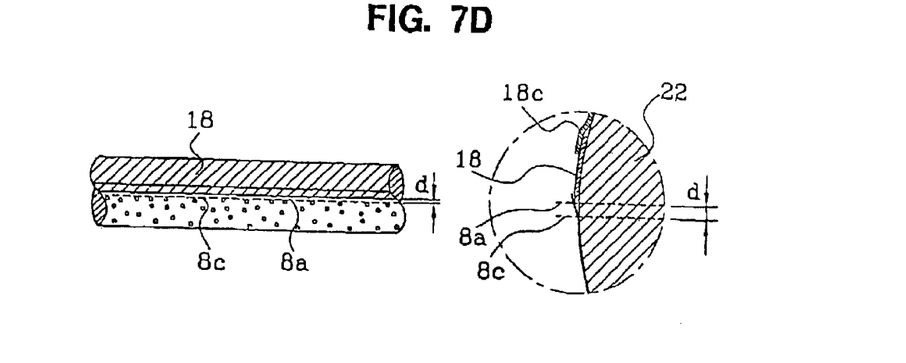

After performing the above removing step, as shown in FIG. 7C, the protective masking tape 18c is attached at the upper portion of the remaining masking tape 18. Then, a pattern is transfer-printed on a surface below the protective masking tape 18c and the transfer-printed surface is cleaned and dried, as shown in FIG. 7D. Then, the protective masking tape 18c and the upper portion of the masking tape 18 is removed. In the above transfer printing step, a transfer printing film is attached at around the conjunction line 8a by being lifted due to a tiny width of the masking tape 18 so that a non transfer-printed strip having a tiny width d is formed. The first transfer printing boundary line 8c maintains a state of not accurately matching the conjunction line 8a.

Figure 7E:
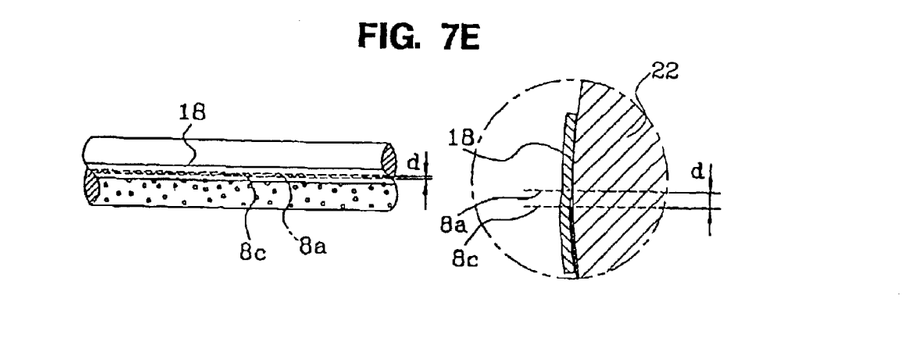
Figure 7F:
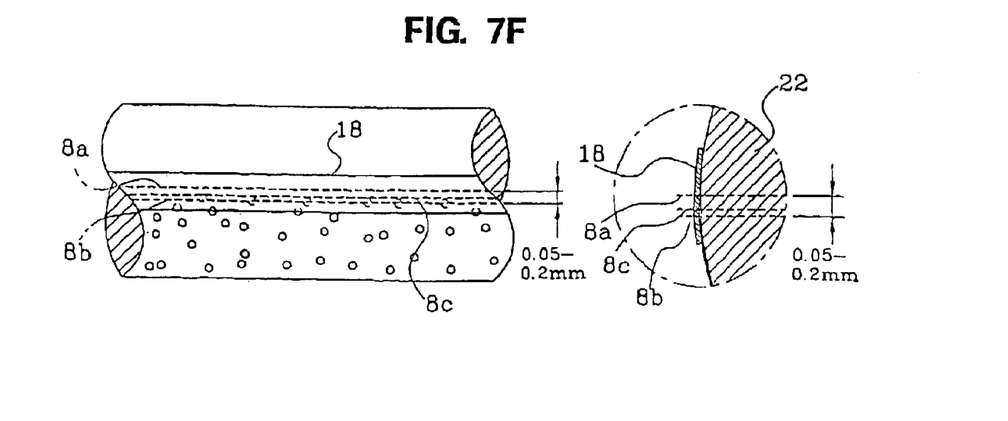

Continuously, the masking tape 18 is attached again at the first transfer-printed boundary portion, as shown in FIG. 7E. The separation line 8b is formed at a position 0.05–0.2 mm below the conjunction line 8a, as shown in FIG. 7F. Here, the separation line 8b is located to be slightly lower than the first transfer printing boundary line 8c.

Figure 7G:
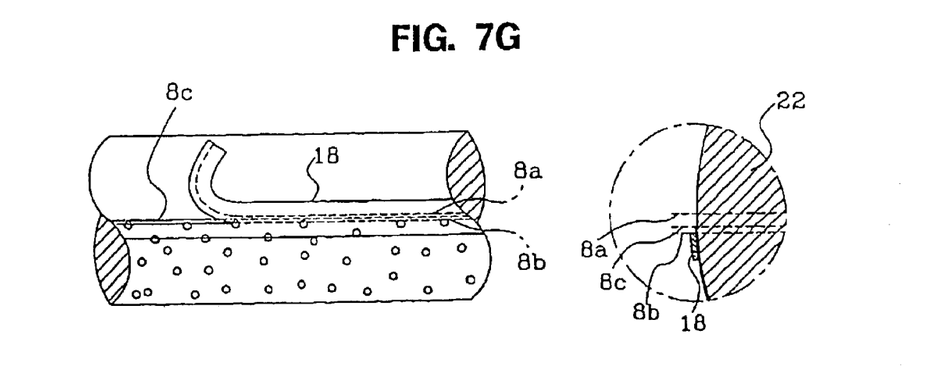
Figure 7H:
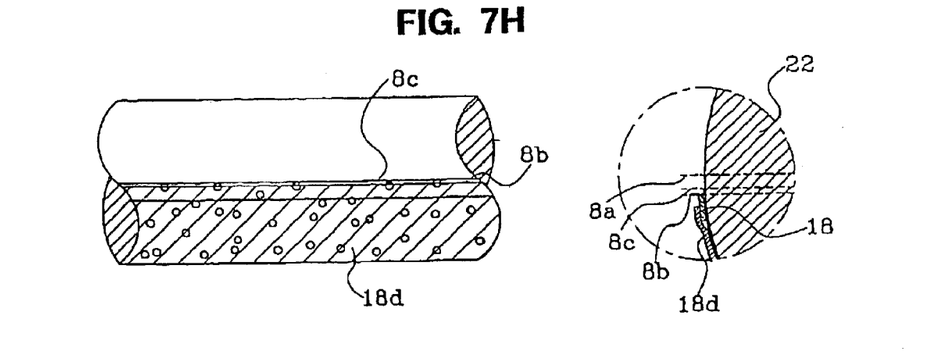
Figure 7I:
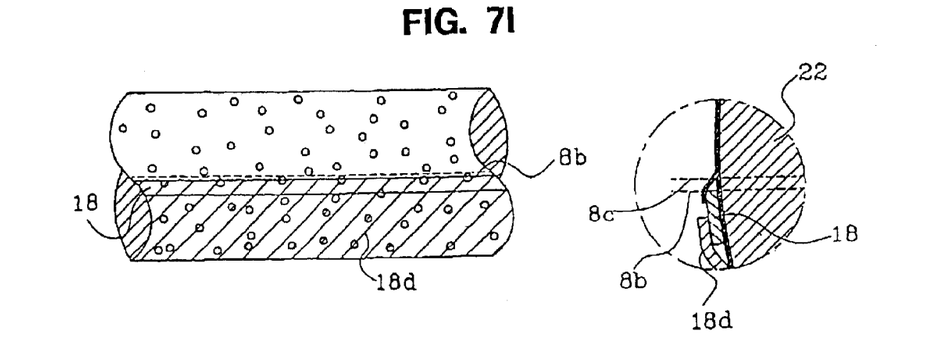

Next, as shown in FIG. 7G, the upper portion of the masking tape 18 with respect to the separation line 8b. A protective masking tape 18d is attached on a portion of the steering wheel rim 22 below the separation line 8b, as shown in FIG. 7H. In the state in which the steering wheel rim 22 is flipped, a pattern is secondly transfer-printed on the portion of the steering wheel rim 22 above the separation line 8b, that is, a non transfer-printed portion, as shown in FIG. 7I, and the transfer-printed portion is cleaned and dried. The protective masking tape 18d and the remaining masking tape 18 are removed so that all the steps are completed. Here, considering a non transfer-printed strip formed due to the thickness of the masking tape 18, since the first transfer printing boundary line 8c is in a state of further covering the surface of the steering wheel rim than the boundary line of the masking tape 18 at the separation line 8b as much as the width of the non transfer-printed portion, when the protective masking tape 18d and the masking tape 18 are removed, transfer printing is performed in a completely matching state without a portion where the conjunction portion is overlapped or a non transfer-printed portion.

INDUSTRIAL APPLICABILITY

According to the present invention, a masking tape is used in a matching process of a combination portion by a PVA solution when separate transfer printing is formed due to a limit in shape of an object subject to transfer printing so that environmental pollution is minimized due to reduction in the amount of waste water. Accordingly, since minimum equipment is added, the efficiency in use of the existing equipment within a limited space is improved so that additional cost for a large scale of equipment is not needed. Thus, productivity can be remarkably improved and the manufacturing cost of products is greatly reduced.

Further, by performing transfer printing twice, even an unskilled worker can perform an accurate pattern match on the boundary surface regardless of conditions for drying. Thus, reliability of products is improved.

What is claimed is:

1. A method for manufacturing a steering wheel rim for an automobile by using a liquid pressure transfer printing method, the method comprising:

attaching a first masking tape having a predetermined width to a boundary portion of the steering wheel rim to be separately transfer-printed;

cutting a junction line in a middle portion of the first masking tape attached to the steering wheel rim, and detaching a lower half portion of the first masking tape;

covering an upper portion of the first masking tape, which has not been detached, with a first protective masking tape;

transfer printing on a surface of the steering wheel rim lower than the junction line, cleaning and drying the transfer-printed surface, and removing the first masking tape which has not been detached and the first protective masking tape covering the upper portion of the first masking tape;

attaching a second masking tape having a predetermined width at a first transfer printing boundary on the steering wheel rim where transfer printing has been performed;

cutting a separation line in the second masking tape at a position below the junction line of the second masking tape attached to the steering wheel rim, and removing an upper half of the second masking tape;

covering a lower portion of the second masking tape, which has not been removed, with a second protective masking tape; and transfer printing on an upper surface of the steering wheel rim, above the junction line, cleaning and drying the upper surface that has been transfer-printed, and removing the second masking tape and the second protective masking tape.

2. A method for manufacturing a steering wheel rim for an automobile by using a liquid pressure transfer printing method, the method comprising:

attaching a first masking tape having a predetermined width to a boundary portion of the steering wheel rim to be separately transfer-printed;

cutting a junction line in a middle portion of the first masking tape attached to the steering wheel rim, and detaching a lower half portion of the first masking tape;

covering an upper portion of the first masking tape, which has not been detached, with a first protective masking tape;

transfer printing on a surface of the steering wheel rim lower than the junction line, cleaning and drying the transfer-printed surface, and removing the first masking tape which has not been detached and the first protective masking tape covering the upper portion of the first masking tape;

attaching a second masking tape having a predetermined width at a first transfer printing boundary on the steering wheel rim where transfer printing has been performed;

cutting a separation line in the second masking tape at a position about 0.05–0.2 mm lower than the junction line of the second masking tape attached to the steering wheel rim, and removing an upper half of the second masking tape;

covering a lower portion of the second masking tape, which has not been removed, with a second protective masking tape; and transfer printing on an upper surface of the steering wheel rim, above the junction line, cleaning and drying the upper surface that has been transfer-printed, and removing the second masking tape and the second protective masking tape.

3. A method for manufacturing a steering wheel rim for an automobile by using a liquid pressure transfer printing method, the method comprising:

attaching a first masking tape having a predetermined width to a boundary portion of the steering wheel rim to be separately transfer-printed;

marking a conjunction line using a blade in a middle portion of the first masking tape attached to the steering wheel rim, with the steering wheel rim placed on a horizontal rotary pedestal, and detaching a lower half portion of the first masking tape;

covering an upper portion of the first masking tape, which is not detached, with a first protective masking tape;

performing transfer printing on a surface of the steering wheel rim lower than the conjunction line and cleaning and drying the transfer-printed surface, and removing the first masking tape which has not been detached and the first protective masking tape covering the upper portion of the first masking tape;

attaching a second masking tape having a predetermined width to a first transfer printing boundary portion of the steering wheel rim to which transfer printing has been performed;

marking a separation line using a blade at a position about 0.05–0.2 mm lower than the conjunction line of the second masking tape attached to the steering wheel rim, which is placed on the horizontal rotary pedestal, and removing an upper half of the second masking tape;

covering a lower portion of the second masking tape which has not been removed with a second protective masking tape; and transfer printing on an upper surface of the steering wheel rim above the conjunction line and cleaning and drying the transfer-printed surface, removing the second masking tape and the second protective masking tape.

* * * * *